Oct. 11, 1966  A. J. SIPIN  3,277,709
VELOCITY FLOWMETERS
Original Filed Feb. 11, 1963

INVENTOR.
Anatole J. Sipin

United States Patent Office 3,277,709
Patented Oct. 11, 1966

3,277,709
VELOCITY FLOWMETERS
Anatole J. Sipin, 117 E. 77th St., New York, N.Y.
Original application Feb. 11, 1963, Ser. No. 257,661, now Patent No. 3,224,272, dated Dec. 21, 1965. Divided and this application Sept. 27, 1965, Ser. No. 490,183
3 Claims. (Cl. 73—230)

This invention relates to an improvement in velocity flowmeters of the axial flow turbine type. The present application is a division of my co-pending application Serial No. 257,661, filed February 11, 1963 for an Improvement in Velocity Flowmeters, now Patent No. 3,224,272.

In devices of this character, the turbine wheel of the meter is assumed to rotate at a speed directly proportional to the average incoming axial velocity of the fluid. Inasmuch as the flow area as the turbine blades or vanes is constant, the volumetric flow of fluid through the meter is inferred from the speed of the rotating element of the axial flow turbine.

Ideally, all the factors that influence the proportionality between the average incoming axial fluid velocity and the rotational speed of the turbine wheel should be constant under all conditions of operation. For a turbine with blades or vanes of uniform and constant pitch, it is necessary that the angular change of velocity experienced by the fluid in passing through the turbine be zero or some constant proportion of the inlet velocity. A change of fluid velocity results in a change of fluid momentum, hence as exchange of mechanical energy between the fluid and the turbine wheel. If the turbine is operating as a motor, that is, if it is being driven by and extracts energy from the fluid, the fluid stream is bent by the turbine blades in a direction opposite to the direction of wheel rotation. If the turbine is operating as a pump, that is, if it is being driven by an external source and supplies energy to the fluid, the fluid stream is bent in the direction of wheel rotation. If the fluid stream is not rotated at all because of the turbine and experiences no angular velocity change in flowing past the turbine blades, there is no change of fluid momentum, and hence there is no mechanical energy exchange between the fluid and the turbine wheel. For every value of the incoming fluid axial velocity, there exists a rotational speed of the turbine wheel such that there is no change in fluid momentum and no relative exchange of energy between the fluid and the turbine wheel. This speed is herein termed the reference speed of the turbine. The deviation of rotational speed from reference speed is termed slip, which is positive when the turbine speed is of greater magnitude and negative when the turbine speed is of lesser magnitude.

In known axial turbine flowmeters, the fluid flow provides the source of power for rotation of the turbine wheel. The fluid flow also supplies energy to operate an output sensing device as well as to overcome bearing friction and viscous drag on the turbine rotor. Since the turbine wheel in this type of meter acts as a fluid motor, it operates always under negative slip, the magnitude of which varies with many factors. The required change of fluid momentum causes an axial downstream thrust to be impressed on the turbines. Thus, thrust bearings are usually required, with an attendant increase of frictional loads. Some meters have an indicator, requiring significant actuating power driven directly by the turbine. With very viscous fluids energy looses due to rotational drag are substantial. All of these loads produce negative slip of a varying and unpredictable nature.

In accordance with the present invention the meter includes an axial flow turbine with a rotating element having blades pitched in the path of a flowing fluid. The element is mounted in a housing so as to be free to translate along the flow axis from a reference position in a section which has no obstruction to the translation. When slip occurs there is also an unbalanced axial force causing the element to translate upstream during positive slip and downstream during negative slip. The translation of the element is measured by a sensor, which provides an output related to the direction and magnitude of displacement of the rotating element from its reference position. A driver, connected to the rotating element, changes its speed in accordance with the sense and amplitude of the output of the translation sensor to null the axial forces and therefore the slip of the elements.

Various further and more specific features and advantages of the invention are hereinafter described in connection with the accompanying drawings.

Figure 1:
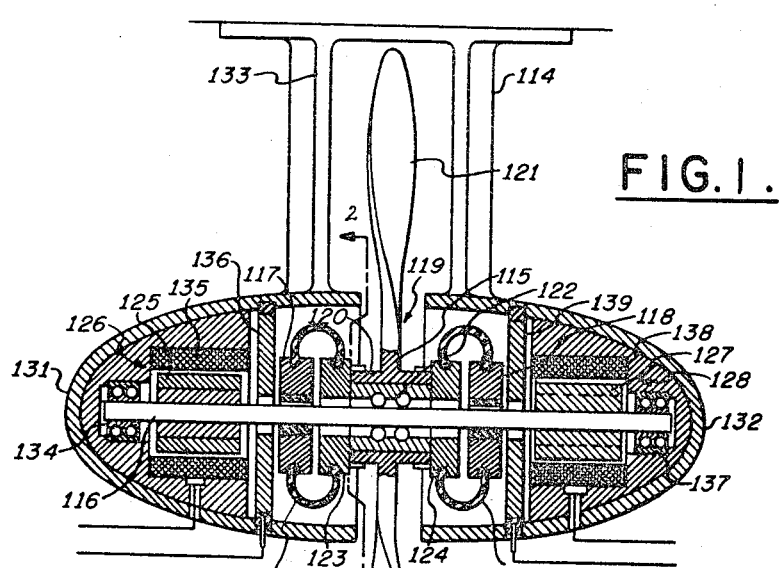
FIG. 1 is a sectional elevation view of the improved meter showing a preferred form of the invention.
Figure 2:
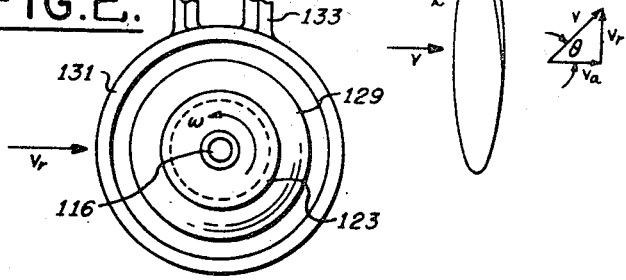
FIG. 2 is a sectional view taken on lines 2—2 in FIG. 1.

The meter consists of a stationary assembly 114 and a rotating assembly 115. The rotating assembly consists of a central shaft 116, upon which are mounted a left hand rotating capacitor plate 117, a right hand rotating capacitor plate 118, and a slidable rotating turbine assembly 119. Plates 117 and 118 are electrically insulated from shaft 116. The turbine assembly consists of a propeller-type turbine 120 with a hub and with multiple blades 121 of conventional section. Turbine 120 is mounted on shaft 116 through rotating ball bushing 122. The turbine assembly has a left hand end plate 123 and a right hand end plate 124. Both end plates have a substantial clearance with shaft 116. At its left end the shaft 116 also carries the short-circuited rotor 125 of an induction motor 126. At its right hand end the shaft carries the permanent magnet rotor 127 of an alternating current generator 128. Plate 123 is attached to plate 117 through a partially toroidal spring 129. Plate 124 is attached to plate 118 through partially toroidal spring 130. Turbine assembly 119 is rotated at the same speed and angle as shaft 116 by plate 117 through spring 129 and by plate 118 through spring 130. Although no rotational motion can occur, relative axial motion between turbine assembly 119 and shaft 116 takes place due to the flexure of springs 129 and 130. The respective springs are suitably insulated from the plates that the same connect.

The stationary assembly 114 consists of a left hand housing 131, a right hand housing 132 and a support bracket 133. Left hand housing 131 contains a left hand shaft ball bearing 134, the stator coil 135 of the induction motor 126 and a stationary left hand capacitor plate 136. Right hand housing 132 consists of a right hand shaft ball bearing 137, the stator coil 138 of generator 128 and a stationary right hand capacitor plate 139. Plate 136 is electrically insulated from housing 131. Plate 139 is electrically insulated from housing 132. The rotating assembly 115 is supported in the stationary assembly 114 by bearings 134 and 137.

Figure 3:
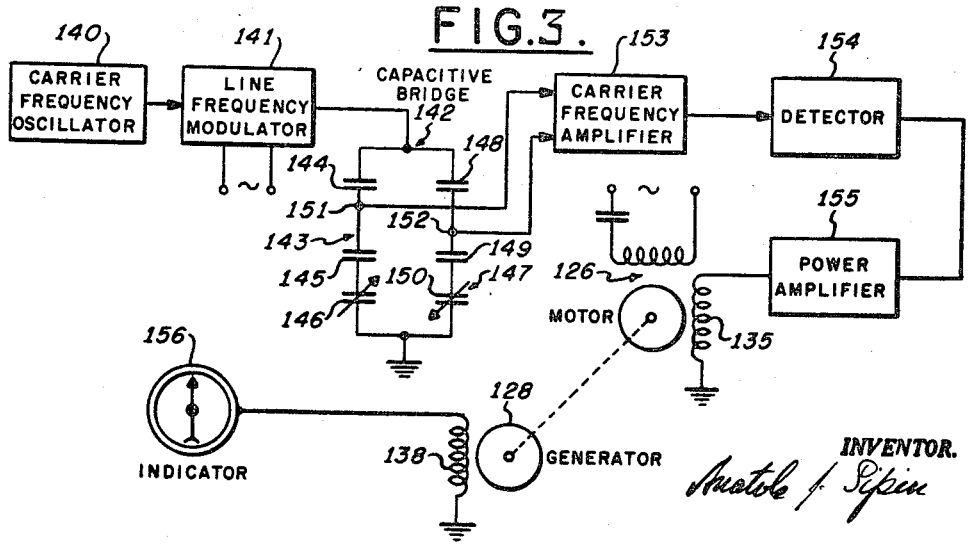
FIG. 3 is a combined circuit and block diagram of electrical components utilized in the form of the invention shown in FIG. 1.

With reference to FIG. 3, a constant carrier frequency voltage, preferably in the middle audio region, is generated by an oscillator 140 which supplies carrier frequency to a modulator 141, where the carrier frequency is modulated by a line frequency at constant voltage. The modulated carrier is fed to a capacitive bridge 142 consisting of one leg 143 with fixed capacitors 144 and 145 and variable capacitor 146 and a second leg 147 with fixed capacitors 148 and 149 and variable capacitor 150. One balance point 151 is between capacitors 144 and 145.

The other balance point 152 is between capacitors 148 and 149. Any voltage difference between the balance points is fed to an amplifier 153 from which an amplified voltage at carrier frequency is fed to detector 154 where the carrier frequency is filtered. A signal at line frequency is passed from detector 154 to a power amplifier 155 whose line frequency output is applied to coil 135, the control phase of split-phase induction motor 126. Fixed capacitor 145 of leg 143 is formed by plates 136 and 117. Variable capacitor 146 is formed by plates 117 and 123. Fixed capacitor 149 of leg 147 is formed by plates 139 and 118. Variable capacitor 150 is formed by plates 118 and 124. Capacitors 146 and 150 are inversely related to the axial position of turbine assembly 119. When turbine assembly 119 is in its center position, capacitors 146 and 150 are equal and the bridge is balanced. If turbine assembly 119 moves to the right of its center position, the gap between plates 124 and 118 decreases, increasing the value of capacitor 150. Also, the gap between plates 123 and 117 increases, decreasing the value of capacitor 146. The bridge is now unbalanced, and a voltage with a particular phase identified with motion to the right of the turbine assembly is fed to the carrier frequency amplifier 153 causing a torque to be applied to the rotor of motor 126 in the associated direction.

The propeller-type blades 121 of turbine 120 are so pitched that with fluid flowing from left to right the direction of rotation is clockwise, looking in the direction of flow. If the rotational speed of the turbine assembly is less than the reference speed for a given flow rate, the resultant fluid velocity will be bent by blades 121 through an angle $\theta$ opposite to the direction of rotation, and there will be an axial force F in the direction of flow proportional to the change in magnitude of axial velocity (V—Va). This force will cause the turbine assembly to move to the right, producing the capacitive changes discussed above, and causing a torque to be applied in a direction to accelerate shaft 116 in the direction of rotation until the reference speed has been reached. If the rotational speed of the turbine is above the reference speed for a given flow rate, the turbine will move to the left and a decelerating torque will be applied to the shaft. Because of the use of capacitors to sense axial position very little motion of the turbine assembly is required for full torque application. Thus, the axial opposing forces of the toroidal springs are minimized. Friction is minimized due to the fact that there is only relative axial motion between the turbine assembly 119 and the shaft 116 permitting the use of a ball bushing, or a ball spline, either of which would be protected from dirt by the toroidal springs at both ends of the turbine assembly.

Since rotor 127 of generator 128 and turbine assembly 119 are driven by the same shaft 116, the voltage output of stator coil 138 is proportional to turbine speed, hence fluid velocity. The output of coil 138 is fed to indicating voltmeter 156 which is calibrated in terms of fluid velocity.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A velocity flowmeter including an axial flow turbine having a housing with a longitudinal axis and an element with blades of uniform pitch extending radially to the longitudinal axis mounted to translate freely in either direction along the longitudinal axis from a reference position, said blades rotating about the longitudinal axis in the path of a flowing fluid and translating along the longitudinal axis from the reference position when the fluid changes velocity; means for nulling the axial force of the flowing fluid on the rotating blades including a displacement transducer with a part fixed to the housing and a part movable with the element having an electrical output related in sense and amplitude to the direction and magnitude of the translation of the rotating element from its reference position and an electric motor for changing the rotational speed of the element in accordance with the sense and amplitude of the output of the transducer; and means dependent on the rotational speed of the element for measuring the velocity of the fluid flowing through the turbine.

2. A flowmeter of the character claimed in claim 1, in which the transducer is a capacitive bridge with a set of plates fixed to the housing and corresponding plates translatable with the rotating element.

3. A velocity flowmeter including an axial flow turbine having a housing, a rotor with blades pitched with respect to the flow axis, translating along the axis with respect to the housing when the fluid changes velocity; means for nulling the axial force of the flowing fluid on the blades including means having a reference with a part fixed with respect to the axis and a part fixed to the rotor for providing an electrical output depending on the sense and magnitude of the displacement of the parts, and an electric motor mounted on the housing and operatively connected to the rotor for changing the rotational speed of the rotor in accordance with the output of the electrical output means.

References Cited by the Examiner
UNITED STATES PATENTS
1,467,565   9/1923   Blair _____ 73—230

RICHARD C. QUEISSER, *Primary Examiner.*

LAWRENCE R. FRANKLIN, *Assistant Examiner.*